UNITED STATES PATENT OFFICE.

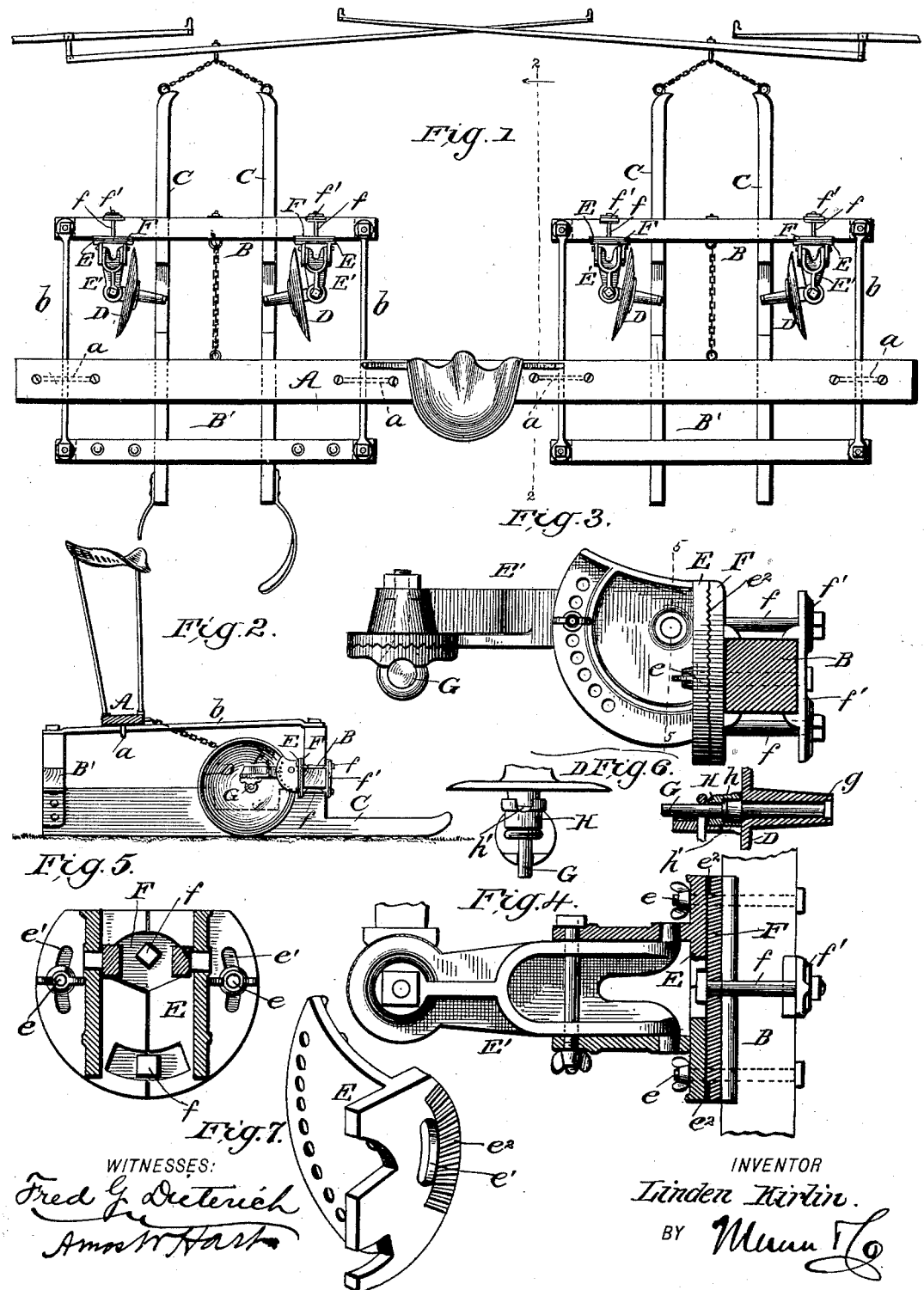

LINDEN KIRLIN, OF BEATTIE, KANSAS.

CULTIVATOR OR SEED-PLANTER.

SPECIFICATION forming part of Letters Patent No. 520,002, dated May 15, 1894.

Application filed December 20, 1893. Serial No. 494,155. (No model.)

*To all whom it may concern:*

Be it known that I, LINDEN KIRLIN, residing at Beattie, in the county of Marshall and State of Kansas, have invented a new and useful Improvement in Cultivators or Seed-Planters, of which the following is a specification.

The object of my invention is to provide an improved self adjusting connection between the main frame of a cultivator or planter and the frame or frames carrying the cultivating and planting devices proper, whereby the latter are adapted to shift laterally automatically as required to enable said devices to work at different distances apart, without requiring to be manually rest or readjusted for that purpose, and also whereby the seat-supporting bar which connects the said frames may be shifted forward and back, as required to enable the driver's weight to be thrown upon the front or rear portion of the runners.

Another object of my invention is to provide an improved sand and dust guard for the bearings of the rotating cultivating device or revolving disk.

To these ends I have devised and adopted the construction and arrangement of parts hereinafter specified and shown in accompanying drawings, in which—

Figure 1 is a plan view of my improvement. Fig. 2 is a vertical section on line 2—2 of Fig. 1. Fig. 3 is a vertical cross section showing a side view of the bracket supporting the pivoted arm to which the cultivating disk is attached. Fig. 4 is a horizontal section, giving a plan of the same parts shown in Fig. 3. Fig. 5 is a detail section taken on line 5—5, Fig. 3. Fig. 6 is a detail view hereinafter referred to. Fig. 7 is a detail perspective view of one half of the adjustable bracket.

The frame of my machine is adapted to serve for use both for cultivating and planting, the only change required being in the special devices employed for the different functions. I do not in this instance exhibit or describe the planting attachment, but the cultivating attachment which embodies a feature of my invention.

A indicates a broad bar or beam arranged transversely and carrying the driver's seat. there are two frames B B', connected self-adjustably with the beam A, each having two parallel runners C C'; and to said frames B B' the cultivating attachment is adjustably connected—as will be presently described.

To the under side of the beam A are secured two pairs of short iron rods $a$ $a$, Figs. 1 and 2, which are in alignment with each other and parallel with the beam. These rods which thus form elongated loops, are straight in their body section and bent upward at their ends through which fastening screws are inserted. Each of said frames B and B' is composed of front and rear bars arranged transversely of the runners C C', and iron rods $b$ $b$, which are parallel to the runners and attached to blocks or posts fixed on the said bars, as shown in Fig. 2. The said rods $b$ $b$ pass through the loops $a$ attached to beam A. The bar A may slide backward or forward on the rods $b$, but the latter incline downwardly from front to rear, and the bar A is connected with the forward bar of frames B and B' by means of chains which may be adjusted in length as required to hold the bar A, in different positions. It is obvious that the runner frames may shift automatically laterally, so that the cultivating or planting devices attached to said frames may work at different distances apart. Thus, if the machine is used to plant corn or other seed in furrows previously made, the runners will follow or "track" in such furrows when aided by the rotary cultivating disk, C, which, in practice, will precede the corn dropper or seeding attachment (not shown). That is to say, the latter will consist chiefly of a hopper having a pendent seed-guide or spout and means for adjusting the seed and regulating its discharge. The seed-dropper will be suitably attached to the runners C. The disk D is journaled in an arm, E', which is in turn pivoted in parallel brackets or wings projecting from a two-part plate or disk E. This connection and arrangement of disk, arm and plate have been before employed, but instead of the bracket plates E being fixed in position as heretofore, they are adjustably attached to a metal head, F, which is clamped to a bar B of one of the supplementary frames. That is to say, the head, F, is secured to the front bar, B, in vertical position, by bolts, $f$, and a clamp piece, $f'$. The bracket plate, E, is made of two like parts, and is similar in shape to the head, F, with which it is adjustably connected by means of clamping screw bolts, e, Fig. 4, that pass through holes in the head, and arc slots, e', in the said plate. The inner or contact surfaces of the head F and bracket plate, E, have correspondingly-toothed portions $e^2$ (Figs. 3 and 7) at their side edges, to prevent them slipping on each other. It is obvious that by adjusting the nuts of bolts, f, the bracket plate, E, may be loosened and set at any desired angle which is done for the purpose of changing the vertical angle of the disk, D, so that it may be caused to cut under the furrow more or less as desired. The bracket plate, E, is provided with suitable openings (Fig. 5) to accommodate the bolts, f, that secure the heads, F, to the bar, B, of the runner frame.

Another feature of my improvement is the means for preventing sand, dirt, &c., from access to the bearings of the disk, D. As shown best in the right-hand portion of Fig. 6, it will be seen that the short axle, G, of the disk, D, has a head on one end which fits in a socket in the outer end, g, of the disk hub, and that the other end of the hub which enters a socket in the bearing H is enlarged, or provided with a projecting circumferential ring, h. By this construction and arrangement, sand, &c., is effectually excluded under ordinary conditions. In order, however, to provide for exit of any sand or dirt that may by chance find its way into the bearing, H, I provide it with an opening, h', on the under side, as shown in the inserted plan view in the left-hand portion of Fig. 6, from which the sand, &c., may escape by gravity.

The machine is provided with a doubletree attachment (as shown in Fig. 1), one being connected with each set of runners, C, and working independently of the other. The runners are preferably curved inward slightly at the front end in order to make them "track" better. It will be noted the disks, D, are so arranged as to throw dirt from the runners. Curved blades or knives are shown attached to the rear ends of the runners.

What I claim is—

1. The combination with the runners and parallel rods arranged parallel to said runners, of the seat-bar, A, having loops on its under side which are arranged lengthwise of the bar, and engage said rods as specified, whereby the bar is adapted to slide forward and backward and also endwise on the rods, as shown and described.

2. The combination with a head adapted to be clamped in vertical position to the frame of a cultivator or planter, of a socket bracket plate, screw bolts for securing it adjustably to said head, and a cultivating device which is connected with the bracket plate, substantially as shown and described, whereby said device may be adjusted and held at different angles as shown and described.

3. In a machine of the character described, the combination with the frame provided with runners, and a metal head clamped thereto in vertical position, of the bracket plate provided with arc-slots, clamping screw bolts which project from the head and through said arc-slots, and a rotary cultivating disk, journaled in an arm which is in turn journaled in wings forming an integral part of said bracket plate, as shown and described.

4. In a machine of the character specified, the combination with the cultivating disk, having a hub provided with a recess in one end and a circumferental projection on the other, and the axle of said disk having a head on one end adapted to fit in said recess, and a separate axle bearing having a socket to receive the enlarged end of the hub, as shown and described, for the purpose specified.

LINDEN KIRLIN.

Witnesses:
M. W. McREYNOLDS,
KATIE O'NEILL.